United States Patent
Bandi et al.

(10) Patent No.: US 11,352,701 B2
(45) Date of Patent: Jun. 7, 2022

(54) METHOD FOR OBTAINING SUPERHYDROPHOBIC CORROSION-RESISTANT COATINGS

(71) Applicant: Tata Consultancy Services Limited, Mumbai (IN)

(72) Inventors: Pallavi Bandi, Pune (IN); Venkata Muralidhar Kanamarlapudi, Pune (IN); Shankar Balajirao Kausley, Pune (IN); Beena Rai, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/176,748

(22) Filed: Feb. 16, 2021

(65) Prior Publication Data

US 2021/0292908 A1    Sep. 23, 2021

(30) Foreign Application Priority Data

Feb. 21, 2020    (IN) .............................. 202021007493

(51) Int. Cl.
| | |
|---|---|
| *C23C 22/83* | (2006.01) |
| *C23C 4/11* | (2016.01) |
| *C09D 5/08* | (2006.01) |
| *C23C 4/02* | (2006.01) |

(52) U.S. Cl.
CPC .............. *C23C 22/83* (2013.01); *C09D 5/084* (2013.01); *C23C 4/02* (2013.01); *C23C 4/11* (2016.01)

(58) Field of Classification Search
None
See application file for complete search history.

(56) References Cited

U.S. PATENT DOCUMENTS

2021/0039049 A1*  2/2021  D'Accorso ........ B01D 67/0079

FOREIGN PATENT DOCUMENTS

| CN | 102259087 B | 8/2013 |
|---|---|---|
| CN | 103952712 A | 7/2014 |
| CN | 103214690 B | 2/2015 |
| CN | 104962126 A | 10/2015 |
| CN | 108003753 A | 5/2018 |
| WO | WO 2019/155446 A1 | 8/2019 |

* cited by examiner

*Primary Examiner* — Michael P. Rodriguez
(74) *Attorney, Agent, or Firm* — Finnegan, Henderson, Farabow, Garrett & Dunner, LLP

(57) ABSTRACT

This disclosure relates to a method for obtaining superhydrophobic corrosion-resistant coatings. State-of-the-art approaches involve etching methods with elevated temperatures and/or longer duration which are complex and use high concentration of combination of acids, alkali, and salt solutions in etching process to obtain a roughness which makes it difficult to handle usage of chemicals and controlling process. The method of the present disclosure has addressed this issue by selection of optimum concentrations of combinations of one or more type of acids, oxidizing agents which are safe, easy to handle and provide better control over the process. The method of the present disclosure is easy, inexpensive, and environmentally friendly. The superhydrophobic corrosion-resistant coatings possess water contact angles greater than 151° and coating efficiency more than 85 percent arrived at by using corrosion currents from polarization studies.

5 Claims, 6 Drawing Sheets ns and the description to refer to the same or like parts.

METHOD FOR OBTAINING SUPERHYDROPHOBIC CORROSION-RESISTANT COATINGS

PRIORITY CLAIM

This U.S. patent application claims priority under 35 U.S.C. § 119 to: India Application No. 202021007493, filed on Feb. 21, 2020. The entire contents of the aforementioned application are incorporated herein by reference.

TECHNICAL FIELD

The disclosure herein generally relates to superhydrophobic corrosion-resistant coatings, and, more particularly, to a method for obtaining superhydrophobic corrosion-resistant coatings.

BACKGROUND

With evolution of multiple new, greener and efficient technologies, many functional materials are developed which help in achieving a sustainable lifestyle. One example of an element used for developing such functional materials includes iron which is fourth most abundant element in earth's crust. Due to huge availability, less cost and several other attributes, iron and its alloys are widely used in many industries/applications across the globe. For example, mild steel and an iron alloy, are versatile materials, which are workhorses for many engineering and industrial applications. However, candidature of iron alloys for certain applications is limited by corrosion which is mainly caused due to presence of water. Thus, functionality such as super hydrophobicity helps in inhibiting corrosion since it provides special wetting characteristics. However, industrial applications often require multiple functionalities, such as both super hydrophobicity and corrosion resistance, as in case of anti-fog/anti-icing applications such as antennas and their parts, signboards, utility towers, support structures in solar panels, telecommunications, broadcasting installations, and the like.

Conventionally, corrosion is mitigated by techniques such as alloying, coatings, inhibitors, design changes, anodic protection, cathodic protection, and the like which are not applicable for each application. Further, choice of mitigation technique is governed by several factors such as service conditions, costs, feasibility, design constraints, availability, environmental factors, and the like.

SUMMARY

Embodiments of the present disclosure present technological improvements as solutions to one or more of the above-mentioned technical problems recognized by the inventors in conventional systems. For example, in one aspect, there is provided a method for obtaining superhydrophobic corrosion-resistant coatings. The method comprises preprocessing surface of at least one of a plurality of iron-based low-carbon metallic materials; etching the preprocessed surface for a duration of 7 minutes to 15 minutes with one or more types of halogen acid solution in optimum concentration range of 0.5 Molar to 3 Molar, including a delayed addition of hydrogen peroxide ($H_2O_2$) of concentration in range of 0.4 Molar to 1 Molar after 15 seconds to 60 seconds; rinsing the etched surface in a first ethanol solution to remove residual etching solution present on the surface; immersing the rinsed surface in a second ethanol solution comprising a low surface energy chemical hexadecyl-tri-methoxysilane (HDTMS) of concentration in a range of 1 to 8 weight percentage for 0.5 hours to 3 hours; air drying the immersed surface; curing the air dried surface in temperature range of about 100 degrees Celsius to 150 degrees Celsius for about 0.5 hours to 6.5 hours; and cooling the cured surface to obtain the superhydrophobic corrosion-resistant coatings on the at least one of the plurality of iron-based low-carbon metallic materials.

In an embodiment, the plurality of iron-based low-carbon metallic materials comprises iron, low carbon steel, low alloyed steel, and micro alloyed steel.

In an embodiment, the step of preprocessing comprises polishing the surface of the at least one of the plurality of iron-based low-carbon metallic materials with emery papers to reach a predefined surface finish, cleaning the surface with water and acetone sequentially, and inspecting the surface for defects.

In an embodiment, the one or more types of halogen acid comprises Hydrochloric acid (HCl), Hydrobromic acid (HBr) and Hydriodic acid (HI).

In an embodiment, the superhydrophobic corrosion-resistant coatings obtained on the at least one of the plurality of iron-based low-carbon metallic materials possess contact angle of more than 151°.

In an embodiment, the superhydrophobic corrosion-resistant coatings obtained on the at least one of the plurality of iron-based low-carbon metallic materials possess coating efficiency more than 85 percent arrived at by using corrosion currents from polarization.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
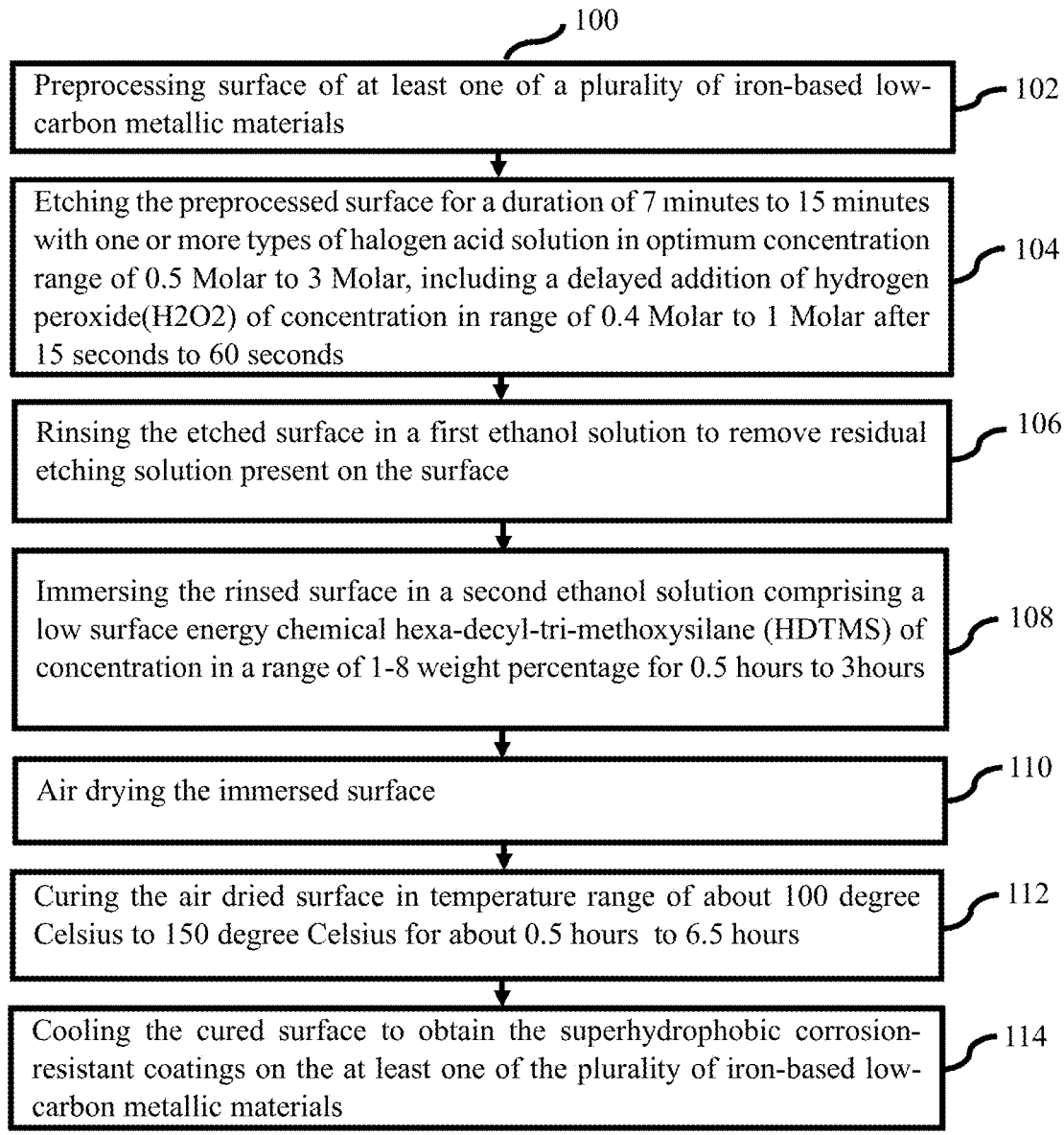
FIG. 1 illustrates a flow diagram of a method for obtaining superhydrophobic corrosion-resistant coatings, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Considering the impact of corrosion and dust contamination on metallic materials, super hydrophobic coatings have been gaining traction due to their special wetting characteristics and self-cleaning feature. Inducing hierarchical roughness and surface modification with low energy chemicals are necessary to attain super hydrophobicity. To impart roughness on substrates, various techniques like nanoparticle deposition, electrodeposition, sandblasting, chemical etching and plasma etching are used. Among these methods, chemical etching is found to be cost-effective and less time consuming. However, existing methodologies based on chemical etching use a high concentration of combination of acids, alkali and salt solutions in etching process to obtain roughness which makes it difficult to handle usage of chemicals and controlling process. The method of the present disclosure has addressed this issue by using a combination of acid and oxidizing agent in minimum concentration during etching to induce roughness. Further the present disclosure discloses optimized concentrations of acid and oxidizing agent which are safe, easy to handle and provide better control over the process. The pursuit of design of coatings for multiple functionalities is complex and nontrivial. Several factors such as cost, environmental damage and simplicity of process route are often overlooked. Optimized values are obtained by carrying out multitude of experiments and balancing one or more factors such as desired functionalities, required attributes at end of each stage with simplicity, and minimal usage of resources such as chemicals, time and the like.

Furthermore, state-of-the-art approaches involve etching methods with elevated temperatures and/or longer duration which are complex and not economical. However, the method of present disclosure uses an etching route which can be carried out at room temperature, requires a short duration and is easy to scale-up. Further, most of the state-of-the-art methods disclose either super hydrophobicity or corrosion resistance, whereas the present disclosure discloses the use of optimum concentrations of specific chemicals to achieve both super hydrophobicity and corrosion resistance on iron-based low-carbon metallic materials. Also, state of the art methods disclose use of fluorine containing low surface energy chemicals such as heptadecafluoro-1,1,2,2-tetrahydodecyl trichlorosilane; tridecafluoro-1,1,2,2-tetrahydrooctyltrichlorosilane; perfluorotetradecyl-H,1H,2H,2H-triethoxysilane; 1H, 1H, 2H, 2H perfluorodecyltrimethylammonium ethoxy silane; and perfluorooctyl triethoxy silane, which are not environmentally friendly. The present disclosure discloses use of hexa-decyl-tri-methoxysilane (HDTMS), a non-fluorine compound that is safe and environmentally friendly.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

FIG. 1 illustrates a flow diagram of a method 100 for obtaining superhydrophobic corrosion-resistant coatings, in accordance with some embodiments of the present disclosure. In an embodiment, the steps of the method 100 will now be explained in detail with reference to FIG. 1. Although process steps, method steps, techniques or the like may be described in a sequential order, such processes, methods and techniques may be configured to work in alternate orders. The steps of processes described herein may be performed in any order practical. Further, some steps may be performed simultaneously.

Referring to FIG. 1, at step 102, the method includes preprocessing surface of at least one of a plurality of iron-based low-carbon metallic materials. In an embodiment, the preprocessing comprises polishing the surface of the at least one of the plurality of iron-based low-carbon metallic materials with emery papers to reach a predefined surface finish, cleaning the surface with water and acetone sequentially, and inspecting the surface for defects. In other words, the surface is first polished with emery papers to give a polished finish. In an embodiment of the present disclosure, the polished finish is obtained using emery papers of specific roughness. The emery paper roughness used for achieving the polish finish for these functionalities should be at least 150 grit coarse or finer. After polishing, the surface is thoroughly cleaned with water and acetone sequentially. Further, the surface is inspected for any visible defects, which are undesirable as they could interfere with further processing steps.

Further at step 104 of FIG. 1, an etching step is performed on the preprocessed surface for a duration of x to y minutes (e.g., 7-15 minutes in the experiment conducted by the present disclosure) with one or more types of halogen acid solutions in optimum concentration range of x to y Molar (e.g., 0.5-3 Molar in the experiment conducted by the present disclosure), including a delayed addition of hydrogen peroxide ($H_2O_2$) of concentration in range of x to y Molar (e.g., 0.4-1 Molar in the experiment conducted by the present disclosure) after x to y seconds (e.g., 15-60 seconds in the experiment conducted by the present disclosure). In other words, the etching step involves preparation of acid and oxidant of desired concentrations separately. Selection of acid and its concentration are governed by several aspects such as control over etching process, handling issues, desired roughness levels, type of metal and the like. Conventionally, there exist methods for preparing superhydrophobic and anticorrosion surfaces for other metals such as aluminum, copper and the like. However, in the context of the present disclosure, the superhydrophobic corrosion-resistant coatings are obtained for the plurality of iron-based low-carbon metallic materials. In an embodiment, the plurality of iron-based low-carbon metallic materials comprise iron, low carbon steel, low alloyed steel, and micro alloyed steel. Corrosion behavior of low-carbon metallic materials such as mild steel differs from the other metals such as aluminum and copper. In an embodiment, mild steel comprises of iron up to 98%, which is electrochemically different from copper, aluminum and other metals. It is known that each element in periodic table has definite electrochemical characteristics, which are different from others. This implies that each alloy has a characteristic electrochemical behavior which may be different from others. From corrosion perspective, reduction potentials of various metals are compared to understand their corrosion tendencies. In addition, emf series and galvanic series are used for convenience of material selection with respect to corrosion. Table 1 below provides a comparison of Standard Electrode Potentials of iron, copper and aluminum.

TABLE 1

| Property | Iron | Copper | Aluminum |
| --- | --- | --- | --- |
| Atomic Number | 26 | 29 | 13 |
| $E^0$ (V) (Reduction potential) | −0.447 | +0.342 | −1.662 |

In the context of present disclosure, reducing mineral acids, preferably one or more types of halogen acids are used to satisfy above conditions. In an embodiment, the one or more types of halogen acids comprise Hydrochloric acid (HCl), Hydrobromic acid (HBr) and hydriodic acid (HI). Here, hydrofluoric acids (HF) are refrained from using since fluorine compounds are non-environment friendly, difficult to handle due to their high reactivity and toxic in nature. Further, to create initial coarse roughness, the preprocessed surface is immersed in an acid solution of concentration in range of x to y Molar (e.g., 0.5 Molar to 3 Molar in the experiment conducted by the present disclosure). After a certain time, which is delay time of 15 seconds to 60 seconds, $H_2O_2$ concentration in range of x to y Molar (e.g., 0.4 Molar to 1 Molar in the experiment conducted by the present disclosure) which is used as an oxidant, is added into etching solution, without disturbing the immersed preprocessed surface. This is deemed to create a fine roughness on coarse roughness. In an embodiment, the coarse roughness is similar to micro-roughness and fine roughness is similar to nano roughness. The etching step is carried out for a total of x to y minutes (e.g., 7.5 minutes to 15 minutes in the experiment conducted by the present disclosure). In this way, a hierarchical roughness is created through careful selection of acid(s) and its concentration, delay time, type of oxidant and its concentration and total time provided for the etching. In an embodiment, in cases where immediate etching could not be carried out, the preprocessed surface is protected from oxidation, with proper surface handling methods such as storage in desiccator, wrapping with inert material such as parafilm and Teflon tape.

Referring to FIG. 1, at step 106, the etched surface is rinsed in a first ethanol solution to remove residual etching solution present on the surface. Further as depicted in step 108 of FIG. 1, the rinsed surface is immersed in a second ethanol solution comprising a low surface energy chemical hexa-decyl-tri-methoxysilane (HDTMS) of concentration in a range of 1 to 8 weight percentage between x to y hours (e.g., 0.5-3 hours in the experiment conducted by the present disclosure). This step is performed to introduce hydrogen bonding. State of the art methods disclose use of HDTMS with different concentration for preparing superhydrophobic surfaces without performing etching step. However, in the context of present disclosure, a specific concentration of HDTMS ranging from x to y weight percentage (e.g., 1 to 8 weight percentage in the experiment conducted by the present disclosure) is used to retain the surface roughness, otherwise insufficient coverage of surface results in loss of superhydrophobicity and corrosion resistance. The excess silane covering the surface reduces the surface roughness, which results in loss of superhydrophobicity. Further, the prior art discloses the use of high concentration of acid/alkali/salt and combination of them which have multiple limitations/problems such as, difficulty in handling the chemicals used and controlling process of etching, emission of toxic gases such as nitrogen di oxide ($NO_2$), Sulphur di oxide ($SO_2$) and the like. However, in the present disclosure, optimum concentrations of specific chemicals such as acid, oxidizing agent and low surface energy chemicals such as HDTMS are used which are safe, easy to handle and provide better control over the process.

Further, as depicted in step 110 of the FIG. 1, the surface immersed in the second ethanol solution is air-dried. At step 112 of the FIG. 1, the air-dried surface is cured at a temperature range of about x to y degree Celsius (e.g., 100 degree Celsius to 150 degree Celsius in the experiment conducted by the present disclosure) for about x to y hours (e.g., 0.5-6.5 hours in the experiment conducted by the present disclosure). This step helps in obtaining strong bonds between the low surface energy chemical (HDTMS) and the surface of the at least one of the plurality of iron-based low-carbon metallic materials. The cured surface, as depicted in step 114 of FIG. 1, is cooled (e.g., furnace-cooled in the experiment conducted by the present disclosure and such cooling approach shall not be construed as limiting the scope) to obtain the superhydrophobic corrosion-resistant coatings on the at least one of the plurality of iron-based low-carbon metallic materials. This step helps in avoiding any shrinkage defects of the HDTMS due to differential cooling.

In accordance with an embodiment of the present disclosure, super hydrophobicity on the at least one of the plurality of iron-based low-carbon metallic materials is tested by measuring contact angle of water on the superhydrophobic corrosion-resistant coatings, using a goniometer. In an embodiment, the superhydrophobic corrosion-resistant coatings obtained on the at least one of the plurality of iron-based low-carbon metallic materials possess contact angle more than 'm' degree (e.g., 151° in the experiment conducted by the present disclosure). In other words, the coatings showing water contact angle more than 150° are considered as superhydrophobic coatings. In the context of present disclosure, the superhydrophobic corrosion-resistant coatings obtained on the at least one of the plurality of iron-based low-carbon metallic materials possess contact angle more than 151°. Also, RMS roughness ($R_q$) obtained on the at least one of the plurality of iron-based low-carbon metallic materials coated with superhydrophobic corrosion-resistant coatings is 205.29 nano meters. Here, the roughness ($R_q$) is obtained using Atomic Force Microscopy. In a similar way, the superhydrophobic corrosion-resistant coatings on the at least one of the plurality of iron-based low-carbon metallic materials are obtained when coating efficiency is more than 85 percent, by using corrosion currents from polarization. In other words, corrosion analysis is carried out in 3.5 weight percent NaCl solution, an equivalent to seawater, using a potentiostat. The corrosion resistance is expressed as coating efficiency which is corrosion current of coated surface relative to that of uncoated surface as a percentage. Lower the corrosion current, higher is the coating efficiency. In the context of present disclosure, it is observed from the corrosion analysis that corrosion current is 'n' times (e.g., 10 times) lower than corrosion current of blank/uncoated surfaces, due to the superhydrophobic coating, implying corrosion resistance of the coating.

Specific examples of the method of the present disclosure: The following examples of the present disclosure in conjunction with further detail below, but the present invention is not limited to the scope of claims.

Example 1

The surface of the at least one of the plurality of iron-based low-carbon metallic materials is polished up to 150 grit emery paper and then cleaned with acetone. Then etching is carried out using 1 Molar Hydrochloric acid (HCl)

alone for 20 seconds, before addition of Hydrogen peroxide (H2O2) to make 0.8 Molar H2O2, with a total etching time of 12 minutes. Then, the surface is rinsed with ethanol and immersed in 2 weight percent HDTMS-ethanol solution. After immersion step, the surface is air-dried and cured in oven at 135 degree Celsius for 4.5 hours. The furnace cooled surface has shown contact angle of 156°, which is more than 150°, hence it can be claimed as a superhydrophobic surface. The same surface has shown coating efficiency of 91.3 percent in 3.5 weight percent sodium chloride (NaCl) solution.

Example 2

The surface of the at least one of the plurality of iron-based low-carbon metallic materials is polished up to 400 grit emery paper and then cleaned with acetone. Then etching is carried out using 2 Molar Hydrochloric acid (HCl) alone for 40 seconds, before addition of Hydrogen peroxide (H2O2) to make 0.8 Molar H2O2, with a total etching time of 11 minutes. Then the surface is rinsed with ethanol and immersed in 4 weight percent HDTMS-ethanol solution. After immersion step, the surface is air-dried and cured in oven at 125 degree Celsius for 2.25 hours. The furnace cooled surface shows super hydrophobicity which means roll-off of water droplet and coating efficiency of 89 percent in 3.5 weight percent sodium chloride (NaCl) solution.

EXPERIMENTAL RESULTS

Figure 2:
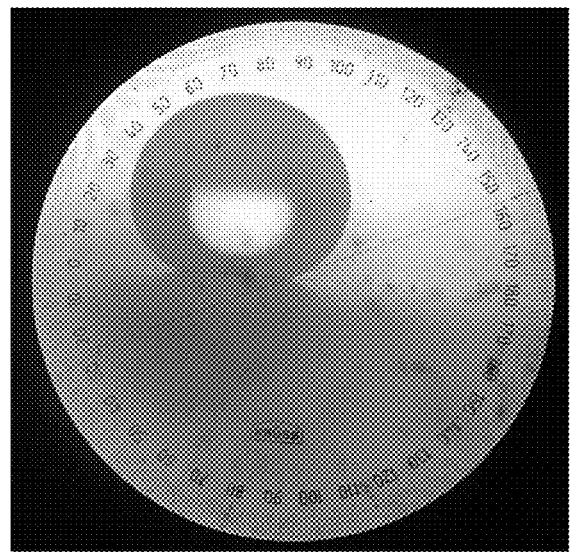
FIG. 2 is an exemplary diagram illustrating superhydrophobic surface contact angle, in accordance with some embodiments of the present disclosure.
Figure 3:
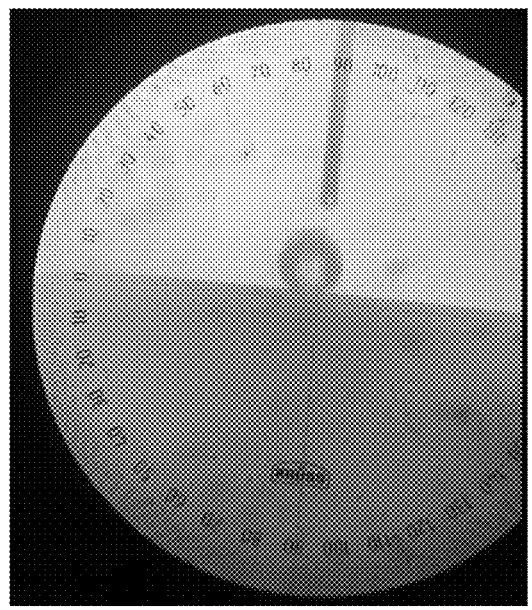
FIG. 3 illustrates a roll-off showing a high contact angle, in accordance with some embodiments of the present disclosure.

FIG. 2 is an exemplary diagram illustrating superhydrophobic surface contact angle, in accordance with some embodiments of the present disclosure. FIG. 2 shows 6-microliter water droplet contact angle measurement using a goniometer for example 1 mentioned above. As can be seen in FIG. 2, superhydrophobic corrosion-resistant coatings obtained for example 1 shows a contact angle of 156°. FIG. 3 illustrates a roll-off showing a high contact angle, in accordance with some embodiments of the present disclosure. FIG. 3 shows 6-microliter water droplet contact angle measurement using a goniometer for example 2 mentioned above.

Figure 4:
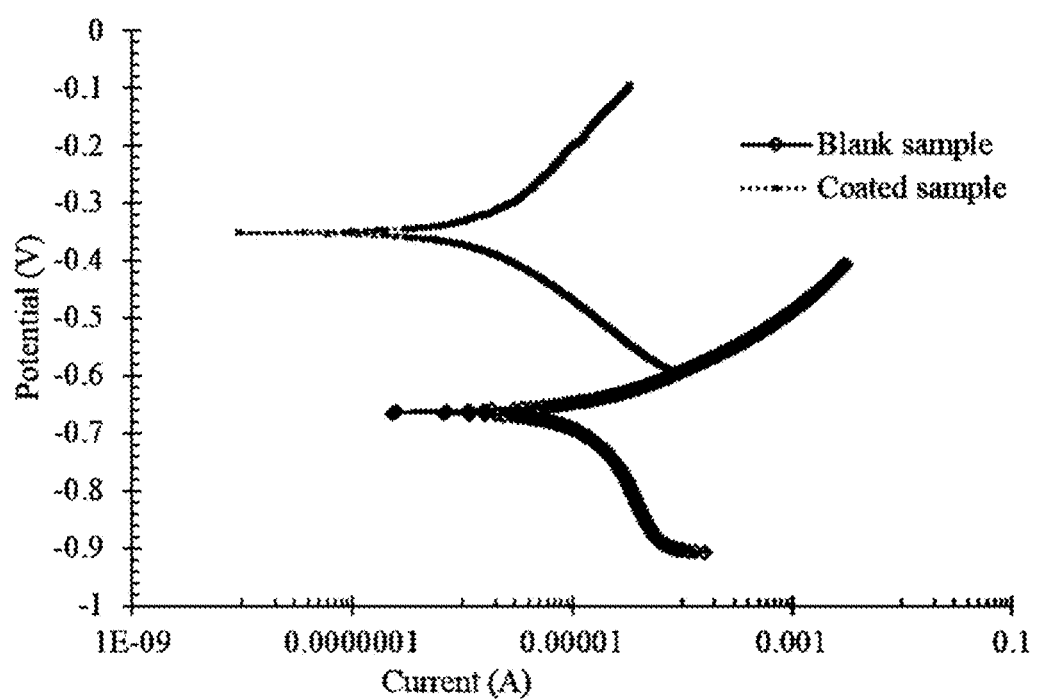
FIG. 4 illustrates potentiodynamic polarization curves for uncoated and superhydrophobic corrosion-resistant surfaces, in accordance with some embodiments of the present disclosure.

FIG. 4 illustrates potentiodynamic polarization curves for uncoated and coated surfaces, in accordance with some embodiments of the present disclosure. As can be seen in FIG. 4, a representation of polarization plot comparison between coated surface (referred as coated sample in FIG. 4) and uncoated surface (referred as blank sample in FIG. 4) of example 2 is provided. Here, values of corrosion current from polarization plots are compared for superhydrophobic corrosion resistant and uncoated surfaces, which show that the value of corrosion current is approximately 10 times lower for coated surface than that of uncoated surface. This suggests that the corrosion resistance of coated surface is approximately 10 times greater than that of uncoated surface.

Figure 5A:
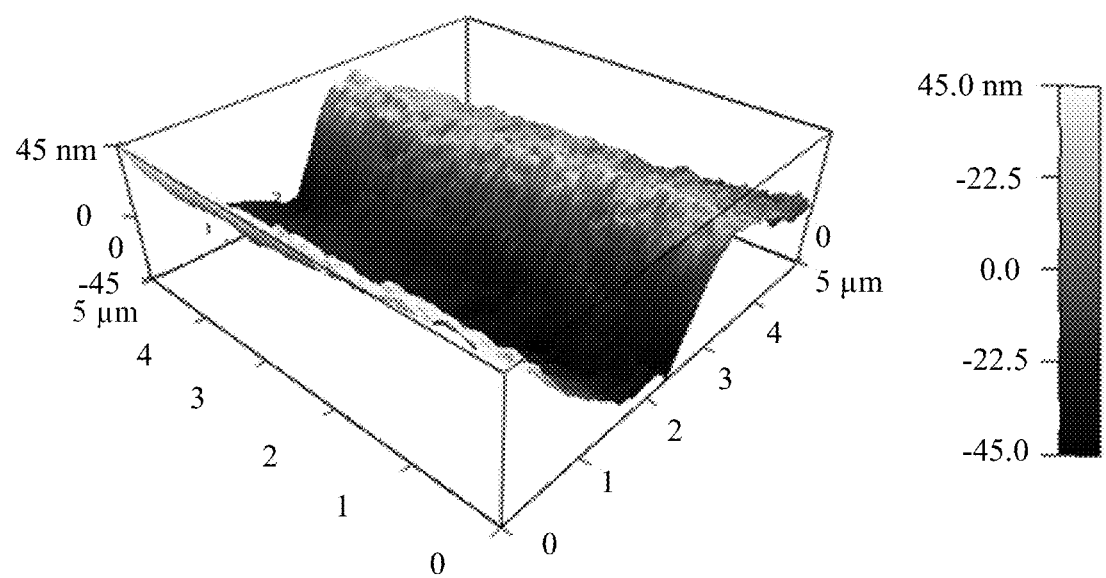
FIGS. 5A and 5B illustrate 3D roughness of uncoated surface and superhydrophobic corrosion-resistant surface respectively obtained using Atomic Force Microscopy, in accordance with some embodiments of the present disclosure.
Figure 5B:
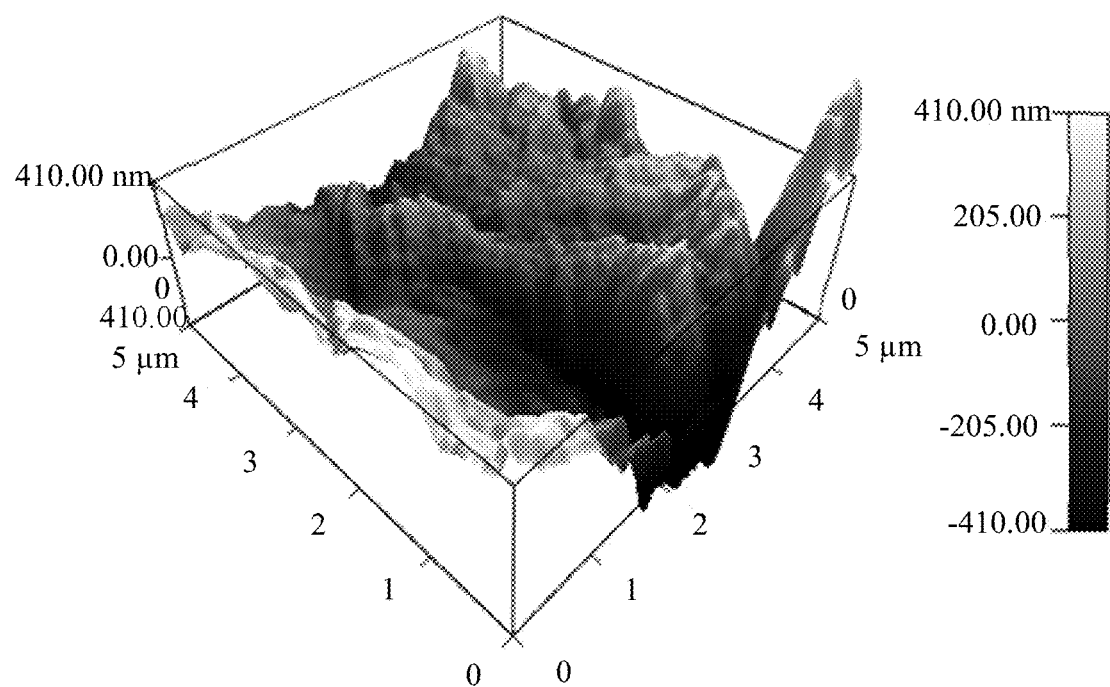

FIGS. 5A and 5B illustrate 3D roughness of uncoated surface and superhydrophobic corrosion-resistant surface respectively obtained using Atomic Force Microscopy, in accordance with some embodiments of the present disclosure. As depicted in FIGS. 5A and 5B, 3D roughness plots for uncoated surfaces and superhydrophobic corrosion-resistant surfaces reveal that superhydrophobic corrosion-resistant surfaces (Alternatively referred as coated surface) have hierarchical roughness, while the uncoated surfaces do not have such feature.

The embodiments of present disclosure herein address unresolved problem of obtaining both superhydrophobic and corrosion-resistant coatings on iron-based low-carbon metallic materials in an easy, cost effective and environment friendly manner. The method of the present disclosure employs an etching route which is economical and easy. Also, the method of the present disclosure is devoid of any polymer engineering, nanoparticles which are toxic and unstable, expensive coating techniques which are difficult to handle, and fluorine compounds which are harmful and not environment friendly.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A method for obtaining superhydrophobic corrosion-resistant coatings, the method comprising:
preprocessing a surface of at least one of a plurality of iron-based low-carbon metallic materials;
etching the preprocessed surface for a duration of 7 minutes to 15 minutes with one or more types of halogen acid solution in optimum concentration range of 0.5 Molar to 3 Molar, including a delayed addition of hydrogen peroxide ($H_2O_2$) of concentration in range of 0.4 Molar to 1 Molar after 15 seconds to 60 seconds, wherein the one or more types of halogen acid solution comprises Hydrochloric acid (HCl), Hydrobromic acid (HBr) and Hydriodic acid (HI);
rinsing the etched surface in a first ethanol solution to remove residual etching solution present on the surface;
immersing the rinsed surface in a second ethanol solution comprising a low surface energy chemical hexa-decyltri-methoxysilane (HDTMS) of concentration in a range of 1 to 8 weight percentage for 0.5 hours to 3 hours;

air drying the immersed surface;

curing the air dried surface in temperature range of about 100 degrees Celsius to 150 degrees Celsius for about 0.5 hours to 6.5 hours; and cooling the cured surface to obtain the superhydrophobic corrosion-resistant coatings on the at least one of the plurality of iron-based low-carbon metallic materials.

2. The method as claimed in claim 1, wherein the plurality of iron-based low-carbon metallic materials comprises iron, low carbon steel, low alloyed steel, and micro alloyed steel.

3. The method as claimed in claim 1, wherein the pre-processing comprising comprises polishing the surface of the at least one of the plurality of iron-based low-carbon metallic materials with emery papers to reach a predefined surface finish, cleaning the surface with water and acetone sequentially, and inspecting the surface for defects.

4. The method as claimed in claim 1, wherein the super-hydrophobic corrosion- resistant coatings obtained on the at least one of the plurality of iron-based low-carbon metallic materials possesses a water contact angle of more than 151°.

5. The method as claimed in claim 1, wherein the super-hydrophobic corrosion- resistant coatings obtained on the at least one of the plurality of iron-based low-carbon metallic materials possess coating efficiency greater than 85 percent arrived at by using corrosion currents from polarization.

* * * * *